United States Patent [19]

Yarber

[11] 3,721,321

[45] March 20, 1973

[54] FRICTION COEFFICIENT COMPENSATING BRAKING APPARATUS

[76] Inventor: Gordon W. Yarber, 6070 Canyon Road, Malibu, Calif. 90265

[22] Filed: June 25, 1971

[21] Appl. No.: 156,929

Related U.S. Application Data

[63] Continuation of Ser. No. 848,307, Aug. 7, 1969, abandoned.

[52] U.S. Cl. ............188/72.6, 188/71.8, 188/196 P
[51] Int. Cl. ..............................................F16d 55/26
[58] Field of Search .......188/71.8, 196 P, 72.2, 72.6, 188/72.9

[56] References Cited

FOREIGN PATENTS OR APPLICATIONS

| | | |
|---|---|---|
| 1,034,172 | 6/1966 | Great Britain......................188/72.2 |
| 730,053 | 5/1955 | Great Britain......................188/72.2 |
| 829,866 | 3/1960 | Great Britain......................188/72.3 |

*Primary Examiner*—George E. A. Halvosa
*Attorney*—White & Haefliger

[57] ABSTRACT

The invention concerns friction braking apparatus incorporating provision for mechanical force feedback proportional to torque, and which results in a near constant relationship or transfer function between the force applied to result in brake lining pressure on the rotor, and the developed braking force which results in deceleration.

7 Claims, 6 Drawing Figures

INVENTOR.
GORDON W. YARBER
By White & Haefliger
ATTORNEYS.

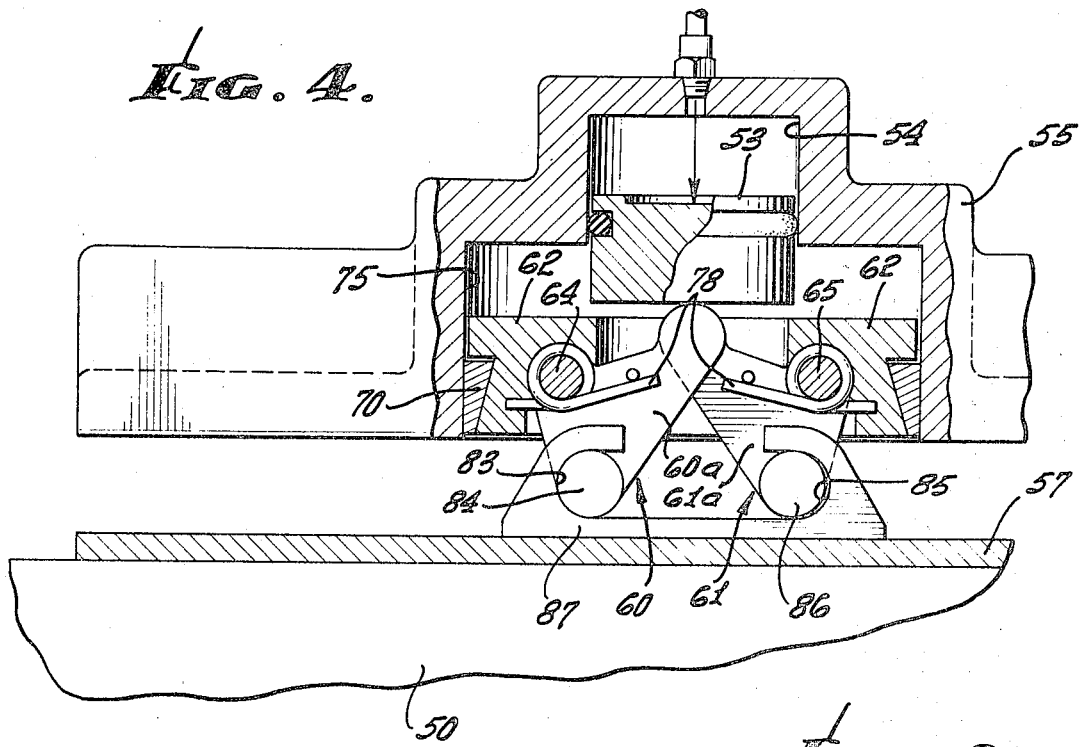
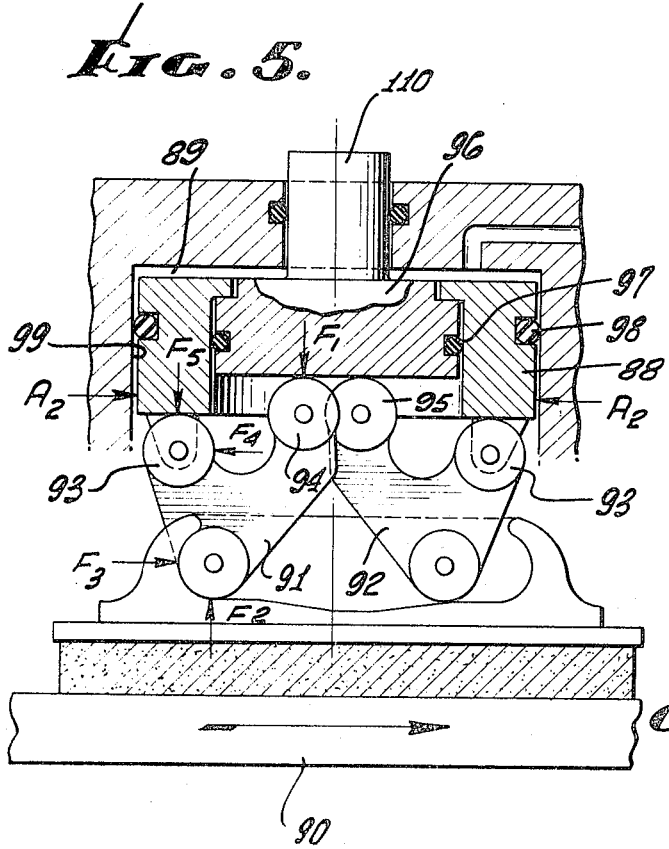
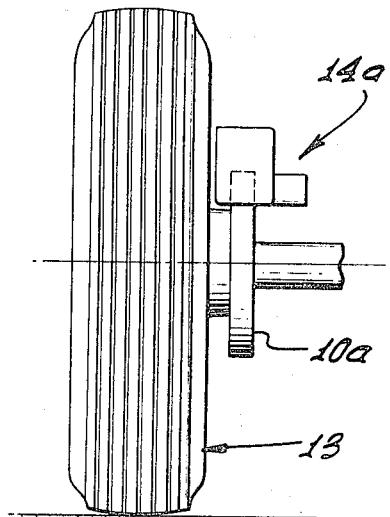
INVENTOR.
GORDON W. YARBER
By White & Haefliger
ATTORNEYS.

FRICTION COEFFICIENT COMPENSATING BRAKING APPARATUS

This is a continuation of application Ser. No. 848,307, filed Aug. 7, 1969, now abandoned.

BACKGROUND OF THE INVENTION

This invention relates generally to friction braking apparatus, and more particularly concerns improvements in such apparatus embodying compensation for variations in brake lining coefficient of friction.

When friction brakes are required to absorb a relatively great amount of kinetic energy, appearing as heat, it is found that the lining coefficient of friction undergoes a significant change. This in turn results in a change in the braking force exerted on the rotor or disc during deceleration, with the result that more braking effort (or actuating force) is required to be applied to slow the vehicle to a predetermined speed within a predetermined range of vehicle travel. The problem of change of lining coefficient of friction with temperature becomes acute in certain instances, as for example in cases where a moving vehicle such as a train is to be brought to a stop at a predetermined location and under automatic control. Varying amounts of train loading produce varying amounts of kinetic energy that must be absorbed by the friction brakes and dissipated as heat, which in turn has an affect upon the lining coefficient of friction. Accordingly, the problem of achieving automatic brake control to stop the vehicle at a given location, or within a given distance, is made much more difficult to overcome. Efforts to alleviate this problem involving electronic equipment are not generally satisfactory, due to their complexity and cost.

SUMMARY OF THE INVENTION

It is a major object of the invention to provide unusually advantageous method and means mechanically compensating for variation in brake lining coefficient of friction, so as to overcome the above and other problems associated with friction braking systems. As will appear, the invention incorporates provision for mechanical force feedback proportional to torque, and which results in a near constant relationship or transfer function between the force applied to result in brake lining pressure on the rotor, and the developed braking force which results in deceleration.

Basically, apparatus that incorporates the invention will include means (as for example a pusher) to apply external force; structure including brake lining; and actuator means carried to pivot and to be responsive to application of said external force for transmitting actuating force to effect forcible engagement of the lining with a relatively rotating rotor to develop braking force; the actuator means characterized as having such pivoted orientation relative to the external force application and actuating force transmission that the developed braking force is substantially independent of temperature and surface speed induced changes in the lining coefficient of friction. Typically, the actuator means may define a first pivot axis, and the actuator means receives application of external force $F_1$ at a first location to develop a first movement $M_1$ acting about the first axis; the actuator means receives application of reaction force $F_2$ equal and opposite to the actuating force and at a second location to develop a second moment $M_2$ acting about the pivot axis to oppose $M_1$; and the actuator means receives application of reaction force $F_3$ equal and opposite to the braking force and at a third location to develop a third moment $M_3$ acting about the pivot axis to oppose $M_1$, the sum of $M_1$, $M_2$ and $M_3$ being equal to zero. In this regard, the relationships are such that the ratio of $F_1$ to $F_3$ remains substantially constant and independent of lining coefficient of friction. Further, provision may be made for bidirectional braking incorporating the above advantages, through the use of two pivoted actuators with unusually advantageous cooperative arrangement, as will appear.

It is another object of the invention to provide actuator means as referred to above and having releasable interconnection with the shoe structure that carries the lining, such that actuating force is positively transmitted to that structure when the latter is frictionally urged in one direction of rotor rotation by the braked rotor, and the interconnection is releasable so as not to positively transmit actuating force to such structure when the rotor rotates in the opposite direction. In this regard, the actuator may have a form similar to a bell crank, with a first arm extending to receive application of pushing (external) force, and a second arm having the releasable connection with the referred to structure. Further, the interconnection may include socket and pivot elements one of which is on the second arm and the other of which is on the referred to structure, the pivot element being fully receivable into the socket element during said positive transmission of actuating force and defining an interconnection axis close to a plane passing through the first pivot axis (of the actuator or crank) and normal to the lining surface engagable with the rotor.

Additional objects and advantages include the provision of carrier means to carry the actuating means (or crank) to accommodate pivoting of the latter, the carrier being subject to bodily advancement relatively toward the rotor for effecting brake shoe advancement toward the rotor by the actuator to compensate for shoe wear; the provision for blocking retraction of the carrier relative to the braked rotor; the provision of a fluid pressure actuated movable piston to exert external or pushing force, and a stop to limit piston displacement to prevent excessive pivoting of the actuator; the provision of two pivoted actuators carried by the carrier means, one actuator functioning when the shoe brakes the rotor rotating in one direction and the other actuator functioning when the shoe brakes the rotor rotating in the opposite direction, as will be described; and the provision of torsion springs to urge the actuators in directions tending to move the shoe structure away from the rotor.

These and other objects and advantages of the invention, as well as the details of illustrative embodiments will be more fully understood from the following specification and drawings, in which:

DRAWING DESCRIPTION

FIG. 4 is a view like FIG. 2, but showing the device configuration following considerable lining wear;

FIG. 5 is an elevation showing still another embodiment of the invention;

FIG. 6 illustrates one application of the invention.

DESCRIPTION OF PREFERRED EMBODIMENTS

Figure 1:
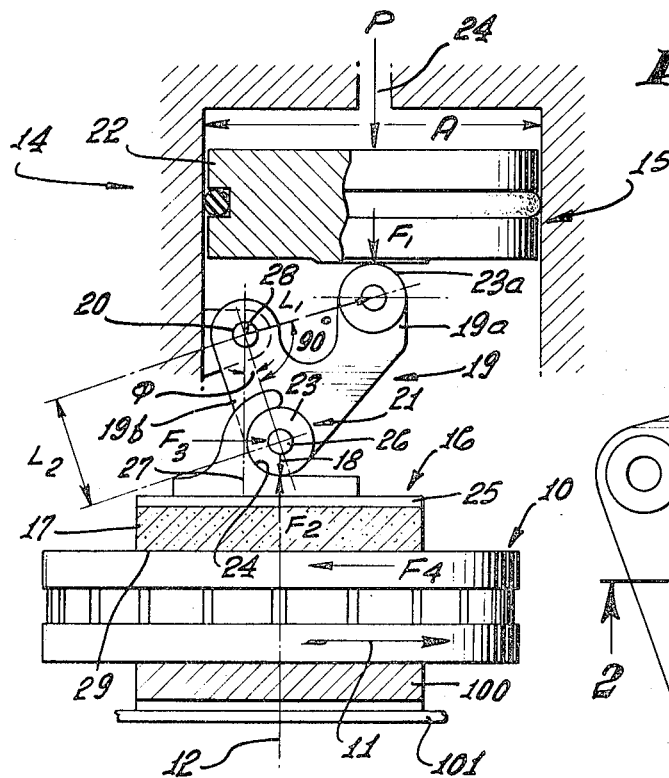
FIG. 1 is an elevation showing one embodiment of the invention.
Figure 3:
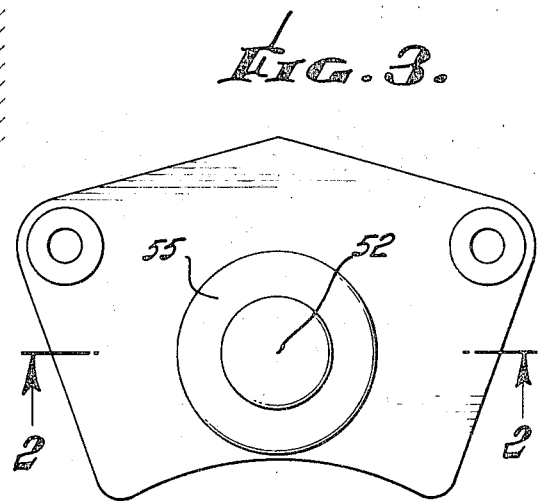
FIG. 3 is a plan view of the FIG. 2 apparatus.

Referring first to FIG. 1, a rotor is shown at 10 as rotating in the direction of arrow 11 and about an axis 12. FIG. 6 shows a similar rotor or disc 10a associated with a vehicle wheel 13 and adapted to be braked by apparatus 14a.

Corresponding braking apparatus 14 shown in FIG. 1 includes means to apply external force, one form of which means is indicated at 15; structure (as for example 16) including a brake lining 17; and actuator means carried to pivot and to be responsive to application of such external force for transmitting actuating force to effect forcible engagement of the lining 17 with the relatively rotating rotor 10 to develop braking force. In the example, the external force appears at $F_1$. The actuating force at 18 and the braking force at $F_4$. As will appear, the actuator means, generally indicated at 19 is characterized as having such pivoted orientation relative to the external force application and the actuating force transmission that developed braking force is substantially independent of temperature induced changes in the lining coefficient of friction.

In the example shown, the actuator means has a form similar to that of a bell crank pivoted at 20 and with a first arm 19a extending to receive application of external pushing force $F_1$ and a second arm 19b having releasable connection at 21 with the structure 16. The pushing force $F_1$ is exerted by a piston 22 against the convex terminal 23a of arm 19a, fluid pressure P being supplied at 24 and exerted over the piston area A. The releasable interconnection 21 includes socket and pivot elements one of which is on the actuator arm 19b and the other of which is on the structure 16. For example, pivot element 23 on arm 19b is fully received into the socket element 24 on lining mounting plate 25 during positive transmission of actuating force 18. Element 23 defines an interconnection axis 26 (through which actuating force 18 and reaction force $F_2$ act) relatively close to a plane 27 passing through the first pivot axis 28 and extending normal to the lining or shoe surface 29 engagable with rotor or disc 10.

It will be seen from FIG. 1 that force $F_1$ exerts a first moment $M_1$ about axis 28; reaction force $F_2$ operates to develop a second moment $M_2$ acting about axis 28; and that the actuator receives application of reaction force $F_3$ equal and opposite to the braking force $F_4$ transmitted to the rotor and developed in response to frictional engagement of the lining with the rotor. For equilibrium to exist, the sum of such moment is equal to zero, as follows:

$$M_1 + M_2 + M_3 = 0 \quad \text{Eq. 1}$$

This equation may also be expressed as follows with $l_1$, $l_2$ and $\phi$ corresponding to the parameters seen in FIG. 1:

$$F_2 l_2 \sin\phi + F_3 l_2 \cos\phi - F_1 l_1 \cos\phi = 0 \quad \text{Eq. 2}$$

Considering that $F_2 = F_3/\mu$ where $\mu$ is the coefficient of friction of the lining. Equation 2 may be re-written as follows: $(F_3/\mu) l_2 \sin\phi + F_3 l_2 \cos\phi = F_1 l_1 \cos\phi$ Eq. 3 or, $$F_3 = \left(\frac{\sin\phi}{\mu} + \cos\phi\right) = F_1 \frac{l_1}{l_2} \cos\phi \quad \text{Eq. 4}$$

or, $$F_3 = F_1 \frac{l_1}{l_2} \left(\frac{\mu \cos\phi}{\sin\phi + \mu\cos\phi}\right) \quad \text{Eq. 5}$$

$$F_3 = F_1 \frac{l_1}{l_2} \left(\frac{\mu}{\tan\phi + \mu}\right) \quad \text{Eq. 6}$$

$$F_3 = PA \frac{l_1}{l_2} \left(\frac{\mu}{\tan\phi + \mu}\right) \quad \text{Eq. 7}$$

Equation 6 may also be written as:

$$F_3 = F_1 K (\mu)/(\tan\phi + \mu), \quad \text{Eq. 8}$$

where K is a constant (depending upon the relationship of $l_1$ and $l_2$), and showing that the braking force $F_3$ can be made substantially independent of changes in $\mu$ where $\phi$ is a small angle, say less than 10°. In other words, as $\phi$ approaches zero the value of the expression $\mu/\tan\phi+\mu$ approaches $l$. Specifically, for small $\phi$, the value of $F_3$ is approximately $PA(l_1 l_2)$.

It will also be noted that as $\mu$ decreases due to temperature change, $F_2$ increases in such manner that the braking force $F_3$ remains constant.

Referring again to the connection 21, the socket 24 is open at one side, as shown, to provide the release feature. Accordingly, when the rotor is rotated in the opposite direction so that the directions of the force arrows $F_3$ and $F_4$ are reversed, the socket moves relatively away from the pivot element 23 to effect a release of the connection, for purposes as will appear, so that actuating force is not then positively transmitted to structure 16 by the actuator 19.

FIG. 1 also shows the provision of a second brake shoe or lining 100 at the side of the rotor 10 opposite lining 17. Lining 100 is affixed to a support 101, and is actuated when lining 17 engages the rotor.

Figure 2:
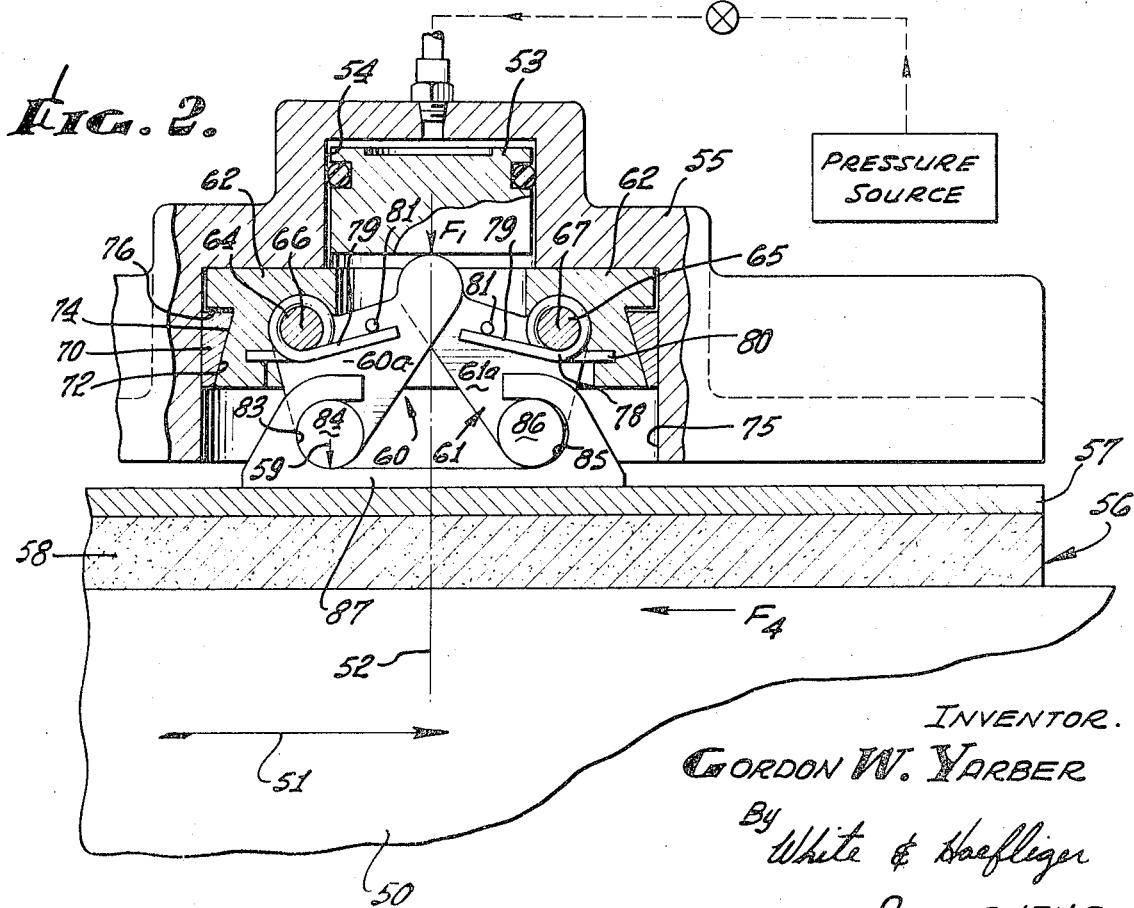
FIG. 2 is an elevation illustrating another form of the invention.

Turning now to FIG. 2, a rotor or disc is shown at 50 as rotating in the direction of arrow 51, and about an axis parallel to axis 52. Means, as for example a pusher, to apply external force $F_1$ is illustrated in the form of a fluid pressure operated piston 53 working in bore 54 of a housing 55. Structure 56 includes a backing plate 57 to which brake lining 58 is integrally attached so as to frictionally engage the rotor 50 in response to transmission of actuating force 59 to such structure via either of two actuators, to be described. When the lining frictionally engages the rotor, braking force $F_4$ is developed, as shown.

In this embodiment, the actuator means includes two pivoted actuators 60 and 61 located to be responsive to application of pushing force $F_1$ to transmit actuating force 59 to structure 56 via one actuator (as for example actuator 60) when the shoe or lining 58 brakes the rotor rotating in one direction, and to transmit actuating force to structure 56 via the other actuator 61 when the shoe brakes the rotor rotating in the opposite rotary direction.

Carrier means for the actuators has the form of annular body or element 62 which pivotally supports the respective actuators at 64 and 65 to rotate about pivot axes 66 and 67. Body 62 is subject to bodily advancement relatively toward the rotor for effecting brake shoe advancement toward the rotor by the actuators to compensate for shoe wear, as better seen in FIG. 4. Note that the piston 53 does not engage body 62, but rather bears against the upper terminals of the actuator crank arms 60a and 61a, the latter projecting in the central space 68 formed by the body 62 between the two pivot axes 66 and 67. Further, the axes 66 and 67 are parallel, and the actuators are symmetrical with respect to and equidistant from the central longitudinal plane defined by axis 52 and extending normal to a lateral plane defined by the two axes 66 and 67.

The carrier means for the actuators may also advantageously include annular wedge element 70 which tapers in a direction toward rotor 50 and which has wedge shoulder 72 which interengages the outer shoulder 74 of the body or element 62 in dovetail relation. Wedge element 70 is pushed forwardly by the forwardly facing annular shoulder 76 on body 62 as the latter advances due to lining wear; also, the wedge element 70 acts to block bodily retraction of the carrier body 62 relatively away from the rotor, due to shoulder interengagement at 72 and 74. In this regard, the outer side of the wedge element 70 slidably engages and is guided by the bore 75 of the housing 55, and the annular body 62 is centered by engagement with wedge ring element 70 to remain coaxial with axis 52.

Also shown in FIGS. 2 and 4 is yieldable means in the form of torsion springs 78 having coils extending about the pivots 64 and 65, and about axes 66 and 67, and terminals 79 and 80 respectively retained by the actuator arms 60a and 61a, and by the carrier body 62. Note the pins 81 on the arms 60a and 61a to retain the spring terminals 79. The construction is such that the actuators are urged in rotary directions tending to urge structure 56 away from the rotor 50, whereby in the absence of fluid pressurization of piston 53, the brake is released.

It is an important feature of the invention shown in FIGS. 2 and 4 that the actuators 60 and 61 and structure 56 have interconnections at positions spaced apart in the direction of rotor rotation; and further, the interconnections are characterized in that one connection positively transmits actuating force to the shoe structure when the latter is frictionally urged in one direction by the braked rotating rotor at which time the other connection is slack, and the other connection positively transmits the actuating force to the shoe structure when the latter is frictionally urged in the opposite direction by the braked rotating rotor, at which time the one connection is slack. In the figures, the one interconnection may comprise the socket and pivot elements 83 and 84, whereas the other interconnection may comprise the socket and pivot elements 85 and 86. Note that the socket elements 83 and 85 are integral with a plate 87 attached to lining backing plate 57.

The connection elements 83 and 85 on the structure 56 are typically spaced apart sufficiently that during braked rotor rotation in the direction of arrow 51 the one pivot element 84 is fully received into C-shaped socket element 83 and the other pivot element 86 is not fully received into the other C-shaped socket element 85 (i.e. it is released). Under such conditions, actuator 60 is transmitting actuating force whereas actuator 61 is not. Alternately, during braked rotor rotation in the opposite direction, the pivot element 86 is fully received into the socket element 85, whereas pivot element 84 is not fully received into socket 83. Under such conditions. the actuator 61 functions to transmit actuating force to the structure 56, whereas actuator 60 does not so function. Therefore, bi-directional braking is achieved with simultaneous independence of braking force from temperature induced changes in lining coefficient of friction.

Referring to FIG. 5, the structure is generally similar to that of FIG. 2, but does contain certain structural differences as respects the carrier means for the actuators. In that form of the invention, the carrier means includes ring-shaped piston 88 subject to forward advancement to compensate for lining wear, fluid pressure in space 89 acting in the piston to urge it toward the rotor 90. The actuator pivots 91 and 92 are suitably retained at 93 by the piston 88 against lateral displacement. The actuator terminals 94 and 95 are engages by the central piston 96 to transmit the pushing force $F_1$, piston 96 being concentric with respect to piston 88 and receiving force mechanically via rod 110. O-rings 97 and 98 respectively seal off between the pistons, and between piston 88 and the housing bore 99.

I claim:
1. In rotor braking apparatus, the combination, comprising
  a. pusher means to apply pushing force,
  b. structure including a brake shoe forcibly engageable with a relatively rotating rotor,
  c. actuator means including a pivoted actuator defining a first pivot axis and located to be responsive to said pushing force to transmit actuating force to said structure,
  d. said actuator means and structure having releasable interconnection with positioning relative to said axis characterized in that said actuating force is positively transmitted to said structure when said structure is frictionally urged in one direction of rotor rotation by the braked rotor, and said connection is releasable so as not to positively transmit actuating force to said structure when said rotor rotates in the opposite direction, and
  e. carrier means carrying said actuator means to accommodate pivoting of the actuator about said first axis, said carrier means being subject to bodily advancement relatively toward the rotor for effecting brake shoe advancement toward the rotor by the actuator to compensate for shoe wear.

2. The combination of claim 1 wherein said carrier means includes components having interengaged wedge shoulders acting to block bodily retraction of the carrier means relatively away from the rotor.

3. In rotor braking apparatus, the combination comprising
  a. pusher means to apply pushing force,
  b. structure including a brake shoe forcibly engageable with one side of a relatively rotating rotor,
  c. means including two pivoted actuators located to be responsive to application of pushing force to transmit actuating force to said structure via one actuator when said shoe brakes the rotor rotating in one rotary direction, and to transmit actuating force to said structure via the other actuator when said shoe brakes the rotor rotating in the opposite rotary direction, and
  d. carrier means carrying said actuators to pivot about spaced axes, said carrier means being subject to bodily advancement relatively toward the rotor for effecting brake shoe advancement toward the rotor by the actuators to compensate for shoe wear.

4. The combination of claim 3 wherein said carrier means includes elements having interengaged wedge shoulders acting to block bodily retraction of the carrier means relatively away from the rotor.

5. The combination of claim 3 wherein said actuators have crank arms projecting in the space between said pivot axes to receive application of said pushing force.

6. The combination of claim 3, including yieldable means urging said actuators in rotary directions tending to urge said structure away from the rotor.

7. The combination of claim 6 wherein said yieldable means comprise torsion springs having coils extending about said axes and terminals retained by said arms and said carrier means.

* * * * *